United States Patent Office 3,845,112
Patented Oct. 29, 1974

---

3,845,112
PROCESS FOR THE PREPARATION OF PERCARBOXYLIC ACIDS
Helmut Waldmann, Leverkusen, Wulf Schwerdtel, Cologne, and Wolfgang Swodenk, Odenthal-Globusch, Germany, assignors to Farbenfabriken Bayer Aktiengesellschaft, Leverkusen, Germany
No Drawing. Filed July 29, 1971, Ser. No. 167,529
Claims priority, application Germany, Aug. 1, 1970, P 20 38 318.0
Int. Cl. C07c 73/10
U.S. Cl. 260—502 R          25 Claims

ABSTRACT OF THE DISCLOSURE

In the preparation of a percarboxylic acid by reaction of a carboxylic acid or its anhydride with hydrogen peroxide, the improvement which comprises adding to a dilute aqueous hydrogen peroxide solution a phosphorus compound of the formula

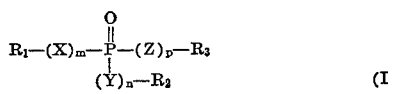

wherein:

X, Y and Z each individually is an oxygen atom, an >—$C_1$–$C_6$ alkyl or an >N—$C_4$–$C_7$ cycloalkyl group,
m, n and p each individually is 0 or 1,
$R_1$, $R_2$ and $R_3$ each individually is a $C_1$–$C_6$ alkyl or $C_4$–$C_6$ cycloalkyl radical optionally substituted with halogen, OH, lower alkoxy, CN or phenyl; or a phenyl radical optionally substituted with halogen, OH, lower alkyl or alkoxy, carbo-lower alkoxy or CN, or two of them together comprise an alkylene radical forming a 5- to 7-membered heterocyclic ring containing phosphorus as a hetero atom, removing the water from said aqueous hydrogen peroxide phosphorus compound-containing solution at least in part, and using the residue to effect said reaction with said carboxylic acid or its anhydride.

Preferably the water is removed by distillation and the residue is mixed with the carboxylic acid or anhydride and an inert diluent which forms an azeotrope with water, the mass being subjected to distillation to form a distillation residue containing a part of the peracid and a condensate which separates into two layers, the lower comprising water and may be recycled, and the other percarboxylic acid which may be combined with the distillation residue.

---

The invention relates to a process for the preparation of percarboxylic acids by the reaction of hydrogen peroxide with carboxylic acid anhydrides or carboxylic acids.

Percarboxylic acids are used as selective oxidizing agents for organic syntheses for example for the preparation of epoxides by the method of Prileschajew (Berichte der dtsch. chem. Ges. 42 4811 (1909)) or for the preparation of esteres from ketones by the well known reaction discovered by Bayer and Villiger (Berichte der dtsch. chem. Ges. 32, 3625 (1899)). Although important chemical starting compounds such as propylene oxide, butylene oxide or caprolactone can therefore be prepared with the aid of percarboxylic acids, the problem of preparing the percarboxylic acids required as starting material has not yet been satisfactorily solved.

There have been basically two methods available for a long time for the preparation of percarboxylic acids, namely, the oxidation of the corresponding aldehydes and the reaction of highly concentrated hydrogen peroxide with acid anhydrides (Beilstein, Volume E III, 2, Part 1, page 379).

Although the conversion of an aldehyde into the corresponding percarboxylic acid by oxidation with molecular oxygen in most cases proceeds with high yields, complications arise in this reaction due to the formation of by-products, for example, the oxidation of acetaldehyde to peracetic acid is accompanied by the formation of (1-hydroxyethyl)-acetal peroxide as an unwanted by-product (Lubansky and Kagan, phys. Chem. 39, pages 840 et seq. (1935)). Moreover, the oxidation must in most cases be accelerated by means of heavy metal ions which may interfere with the subsequent reaction of the percarboxylic acids (German Patent Specification No. 269,927).

The most serious disadvantage of this method of preparation however, is that the carboxylic acid produced in the course of the subsequent oxidizing reaction of the percarboxylic acid obtained by this process cannot be used again directly as a starting material for the preparation of the percarboxylic acid. If, for example, propylene oxide is prepared by the oxidation of propylene with peracetic acid which has been obtained from acetaldehyde, large quantities of acetic acid are produced in addition to propylene oxide, and this acetic acid cannot be used again directly as a starting material for the preparation of the peracetic acid and instead, some other use must be found for it.

The most serious disadvantage of the second known method of preparing percarboxylic acids, which involves the reaction of hydrogen peroxide with acid anhydrides, is that the hydrogen peroxide used as a starting material must be highly concentrated, with the result that the process is very expensive. Not only are expensive safety measures required for handling highly concentrated hydrogen peroxide but also the reaction of hydrogen peroxide with acid anhydrides and in particular with acetic acid anhydride results in unsatisfactory yields because a substantial proportion of the hydrogen peroxide remains unchanged in the course of the reaction even if acetic anhydride is used in excess (see D. Swern. Organic Reactions, Volume 7, page 395 (1953).

In recent times, a process for the preparation of peracetic acid has been worked out according to which isopropanol is oxidized with oxygen or with a gas which contains oxygen, an ester solvent is added to the resulting solution which contains hydrogen peroxide, unreacted isopropanol and acetone, the isopropanol and the acetone are removed from the solution, e.g. by distillation, the resulting solution of $H_2O_2$ in the ester solvent is reacted with acetic acid to form peracetic acid, and the water which is produced concomitantly with the peracetic acid is removed by azeotropic distillation (see DOS 1,-925,379). The reactions just described may be represented by the following reaction scheme:

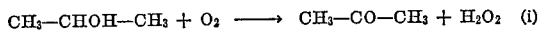
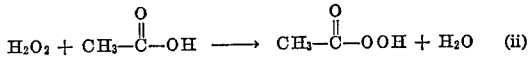

The process just described has the same disadvantages as the method of preparation involving the oxidation of an aldehyde with the production of a carboxylic acid as a by-product that at least 1 mole of by-product, in this case acetone, is obtained with each mole of peracid, and this by-product again cannot be used directly as a starting material for the preparation of per-acetic acid but must either first be hydrogenated to isopropanol or be utilized in some other process.

We have now found that a percarboxylic acid solution or a percarboxylic acid can be prepared by reacting a carboxylic acid anhydride or a carboxylic acid with hydrogen peroxide if a compound of the following general formula (I):

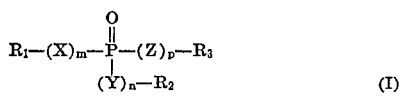

wherein:

X, Y and Z each individually is an oxygen atom, or an >N—$C_1$–$C_6$ alkyl group, or an >N—$C_4$–$C_7$ cyclo-alkyl group;

$R_1$, $R_2$ and $R_3$ each individually is $C_1$–$C_6$ alkyl or $C_4$–$C_6$ cycloalkyl radical which is optionally substituted by at least one halogen, OH, $C_1$–$C_4$ lower alkoxy, CN or phenyl; or a phenyl radical which is optionally substituted by at least one halogen, OH, $C_1$–$C_4$ lower alkoxy, carbo $C_1$–$C_3$ lower alkoxy or CN, or two of them together comprise an alkylene radical forming a 5- to 7-membered heterocyclic ring containing phosphorus as a hetero atom and up to two additional hetero atoms.

is added to a highly dilute aqueous solution of hydrogen peroxide, optionally in the presence of an inert solvent; the water present is optionally partly or completely removed; the reaction mixture is reacted with carboxylic acids and/or carboxylic acid anhydrides at temperatures of from about —20° C. to +100° C. and any water still present, and, in cases where carboxylic acids are used, any water formed in the reaction, is optionally removed; and the percarboxylic acids are optionally isolated from the resulting solution in known manner.

In X, Y or Z of formula (I), the following are mentioned as examples of N—$C_1$–$C_6$-alkyl radicals; N-Methyl, N-ethyl, N-n-propyl, N-isopropyl, N-n-butyl, N-isobutyl, N-tert.-butyl, N-n-pentyl, N-n-hexyl, N-2,3-dimethylbutyl, N-2-methylpentyl, N-3-methylpentyl, N-3,3-dimethylbutyl, N-2-ethylpropyl.

The following are mentioned as examples of N—$C_4$–$C_7$-cyclo-alkyl radicals; N-Cyclobutyl, N-cyclopentyl and N-cyclohexyl.

As $R_1$, $R_2$ or $R_3$, the following are mentioned as examples of $C_1$–$C_6$-alkyl or $C_4$–$C_6$-cycloalkyl radicals which are optionally substituted with halogen (fluorine, chlorine, bromine), hydroxy, $C_1$–$C_4$-alkoxy, carbo-$C_1$–$C_3$-alkoxy, CN or phenyl: Methyl, chloromethyl, hydroxymethyl, methoxymethyl, cyanomethyl, trifluoromethyl, benzyl, ethyl, chloroethyl, hydroxyethyl, methoxyethyl, carbomethoxyethyl, cyanoethyl, phenylethyl, propyl, 1,2,3-trifluoropropyl, trifluoromethylethyl, isopropyl, n-butyl, sec.-butyl, isobutyl, 2-methoxybutyl, 3-methoxybutyl, 4-methoxybutyl, 2-cyanobutyl, 3-cyanobutyl, 4-cyanobutyl, n-pentyl, 2-methylbutyl, 3-methylbutyl, ω-chloropentyl, hydroxymethyl, ω-methoxypentyl, 2-methyl-2-cyanopentyl, 2-methyl-2-methoxypentyl, 3-methyl-2-methoxypentyl, 3-methyl-2-methoxybutyl, 3-methyl-3-chlorobutyl, 3-methyl-2-chlorobutyl, 2-carbomethoxypropyl, 3-carbomethoxypropyl, 3-carbomethoxy-2-methylpropyl, 2-carbomethoxybutyl, 3-carbomethoxybutyl, 4-carbomethoxybutyl, 2-chloropropyl, 3-chloropropyl, 2-chloro-1-chloroethylethyl; Cyclobutyl, cyclopentyl, methylcyclopentyl, cyclohexyl, 2-methyl-cyclohexyl, 3-methyl-cyclohexyl, 4-methyl-cyclohexyl, 1,1,3-trimethyl-cyclohexyl, phenylcyclohexyl, 2-tertiary butyl-cyclohexyl, 3-tertiary butyl-cyclohexyl, 4-tertiary butyl-cyclohexyl, 1-methyl-4-isopropyl-cyclohexyl, 2-cyclopentyl, 3-chlorocyclopentyl, 2-cyanocyclopentyl, 3-cyanocyclopentyl, 2-carbomethoxycyclopentyl, 3-carbomethoxycyclopentyl, 2-methoxymethylcyclopentyl, 3-methoxymethylcyclopentyl, 2-hydroxycyclopentyl, 3-hydroxycyclopentyl, 2-hydroxymethylcyclopentyl, 3-hydroxymethylcyclopentyl, 2-chlorocyclohexyl, 3-chlorocyclohexyl, 4-chlorocyclohexyl, 2-cyanocyclohexyl, 3-cyanocyclohexyl, 4-cyanocyclohexyl, 2-hydroxycyclohexyl, 3-hydroxycyclohexyl, 4-hydroxycyclohexyl, 2-methoxycyclohexyl, 3-methoxycyclohexyl, 4-methoxy-cyclohexyl, 2-hydroxymethylcyclohexyl, 3-hydroxymethylcyclohexyl, 4-hydroxymethylcyclohexyl, 2-carbomethoxycyclohexyl, 3 - carbomethoxycyclohexyl and 4 - carbomethoxycyclohexyl.

The following are examples of suitable phenyl radicals substituted with halogen, hydroxy, $C_1$–$C_4$-alkyl, $C_1$–$C_4$-alkoxy or CN: 2-chlorophenyl, 3-chlorophenyl, 4-chlorophenyl, 2,4-dichlorophenyl, 2,5-dichlorophenyl, 2-hydroxyphenyl, 4-hydroxyphenyl, 2-methylphenyl, 4-methylphenyl, 4-trifluoromethylphenyl, 4-tertiarybutylphenyl, 3-hydroxyphenyl, 2-cyanophenyl, 3-cyanophenyl, 4-cyanophenyl, 2-methoxyphenyl, 3-methoxyphenyl, 4-methoxyphenyl, 2 - carbomethoxyphenyl, 3 - carbomethoxyphenyl, 4-carbomethoxyphenyl, 2-trifluoromethylphenyl, 3-trifluoromethylphenyl and 3-methylphenyl.

The alkylene radicals $R_1$ and $R_2$ or $R_1$ and $R_3$ or $R_2$ and $R_3$ may be the following: Ethylene, propylene, butylene, pentamethylene and hexamethylene.

Among the compounds of formula (I), the following are preferred for the process according to the invention: Phosphoric acid derivatives of the formula (II):

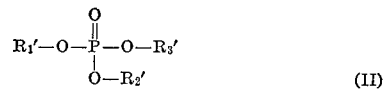

wherein $R_1'$, $R_2'$ and $R_3'$ represents $C_1$–$C_4$ lower alkyl or cyclopentyl or cyclohexyl radicals, optionally substituted with halogen, hydroxy, $C_1$–$C_4$ lower alkoxy, carbo-$C_1$–$C_3$ lower alkoxy, cyano or phenyl, and one of the radicals $R_1'$, $R_2'$ and $R_3'$ may represent a phenyl radical optionally substituted with halogen, hydroxy, $C_1$–$C_4$ lower alkyl, $C_1$–$C_4$ lower alkoxy or CN:

or of the formula (III):

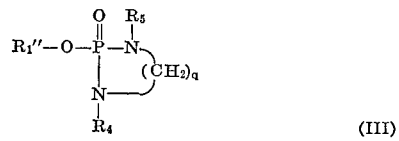

wherein $R_1''$ represents a $C_1$–$C_4$ lower alkyl radical or a cyclopentyl, cyclohexyl or phenyl radical, any of which may be substituted with one or more halogen, hydroxy, $C_1$–$C_4$ lower alkoxy, carbo-$C_1$–$C_3$ lower alkoxy, CN or phenyl group, $R_4$ and $R_5$ represent a straight chain or branched $C_1$–$C_4$ lower alkyl radical and $q$ represents a whole number of from 2 to 4;

or of the formula (IV);

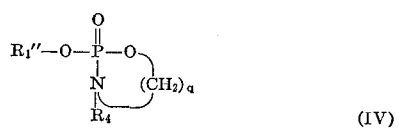

wherein $R_1''$, $R_4$ and $q$ have the meanings already mentioned for formula (III);

or of the formula (V)

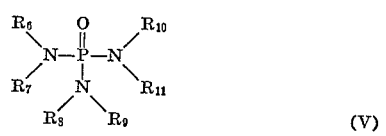

wherein the radicals $R_6$ to $R_{11}$ represent $C_1$–$C_4$-lower alkyl radicals optionally substituted with a hydroxyl group or a cyano group;

Phosphine oxides of the formula (VI) or (VII):

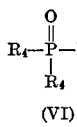 or 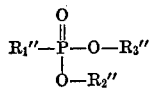

(VI)    (VII)

wherein $R_4$ and $R_5$ have the meanings already indicated;

Phosphonic acid derivatives represented by the formula (VIII):

$$R_1''-\overset{\overset{O}{\|}}{\underset{\underset{R_2''}{|}}{P}}-O-R_3''$$ (VIII)

in which $R_1''$ has the meaning already indicated for formula (III) and $R_2''$ and $R_3''$ represent $C_1-C_6$-alkyl or $C_4-C_6$-cycloalkyl radicals, optionally substituted with halogen, $C_1-C_4$ lower alkoxy, carbo-$C_1-C_3$ lower alkoxy, CN or phenyl;

or by one of the following formulas (IX) to (XII);

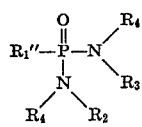 (IX)

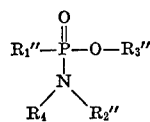 (X)

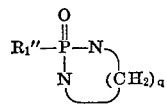 (XI)

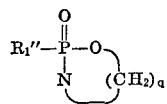 (XII)

in which:

$R_1''$, $R_2''$, $R_3''$, $R_4$ and $q$ have the meanings already indicated; or Phosphinic acid derivatives represented by the formulae (XIII) and (XIV):

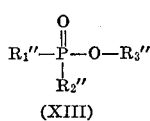    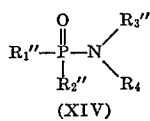

(XIII)    (XIV)

wherein $R_1''$, $R_2''$, $R_3''$ and $R_4$ have the meanings already indicated; or by the formulae (XV) and (XVI):

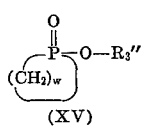    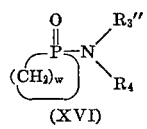

(XV)    (XVI)

wherein $R_3''$ and $R_4$ have the meanings already indicated and $w$ stands for a number of from 4 to 7.

Among the compounds of formulae (I)–(XVII), those represented by the following formulae are particularly suitable for carrying out the process according to the invention, namely:

 (XVII)

wherein $R_{12}$, $R_{13}$ and $R_{14}$ represent straight chained or branched $C_1-C_4$ lower alkyl radicals optionally substituted with halogen, hydroxy, $C_1-C_4$ lower alkoxy, carbo-$C_1-C_3$ lower alkoxy, CN or phenyl;

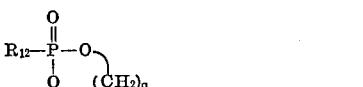 (XVIII)

 (XIX)

 (XX)

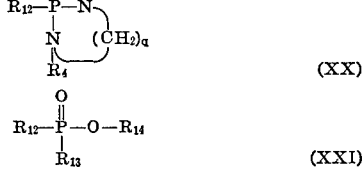 (XXI)

wherein $R_4$, $R_5$, $R_{12}$, $R_{13}$, $R_{14}$ and $q$ have the meanings already indicated;

 (XXII)

wherein $R_{14}$ has the meaning already indicated and $t$ represents the integer 4 or 5.

The group of compounds represented by the following formulae is particularly advantageous:

 (XXIII)

wherein $R_{12}'$ represents a straight chained or branched $C_1-C_4$ lower alkyl radical optionally substituted with a hydroxy or methoxy group and $R_{13}$ has the meaning already indicated; and

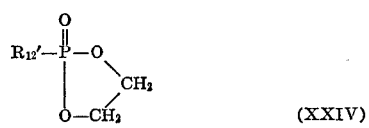 (XXIV)

wherein $R_{12}'$ has the meaning already indicated.

Below is given a list of specific compounds which may be added to the dilute aqueous hydrogen peroxide solution in the process according to the invention:

Trimethyl phosphate, triethyl phosphate, tri-*n*-propyl phosphate, tri - iso - propyl - phosphate, tri-iso-butyl phosphate, tri-sec.-butyl phosphate, trichloromethyl phosphate, trihydroxymethyl phosphate, trimethoxymethyl phosphate, tricarbomethoxymethyl phosphate, tri-2-methoxybutyl phosphate, tri-2-cyanobutyl phosphate,, tri-3-cyanobutyl phosphate, tri-2-methylbutyl phosphate, tri - 3 - methylbutyl phosphate, mono-ω-hydroxypentyldiethyl phosphate, mono-ω-chloropentyldimethyl phosphate, mono-3-methyl-2-cyanopentyldiethyl phosphate, mono - 3 - methoxy-2-chloromethylpropyldiethyl phosphate, mono - 3 - methyl-2-chlorobutyldiethyl phosphate, mono - 2 - carbomethoxypropyldiethyl phosphate, mono-3-carbomethoxypropyldiethyl phosphate, mono-2-chloro-2-chloroethyldiethyl phosphate; tricyclobutyl phosphate, tricyclohexyl phosphate, mono-cyclohexyldiethyl phosphate, mono-2-methylcyclohexyldiethyl phosphate, mono-3-methylcyclohexyl-diethyl phosphate, mono-hydroxycyclohexyl phosphate, di-2-hydroxycyclohexyl-monoethyl phosphate, ethylene glycol-monoethyl phosphate, ethylene glycol-β-chloroethyl phosphate, monoethyl phosphate of propylene-1,3-glycol, monoethyl phosphate of butylene-1,4-glycol, mono-2-tert. butyl-cyclohexyl-diethyl phosphate, mono-2-chloropentyl-diethyl phosphate, mono - 4 - carbomethoxy-cyclohexyl-diethyl phosphate, mono-4-methoxy-cyclohexyl-diethyl phosphate, mono - 4 - chlorocyclohexyl-diethyl phosphate, mono - 4 - cyano-cyclohexyl-diethyl phosphate, mono - 4 - hydroxy - methyl-cyclohexyl-diethyl phosphate; hexamethyl phosphoric acid triamide, hexaethylphosphoric acid triamide, hexa - n - propylphosphoric acid triamide, hexa-isopropyl phosphoric acid triamide, di-n-butyl-tetramethyl phosphoric acid triamide, phosphoric-tri acid (N-cyclobutyl-N-methyl-amide), phosphoric acid tri-(N-cyclohexyl-N-methylamide), phosphoric acid tri-(N-cyclohexylamide), phosphoric acid tri-(N-cyclopentylamide), phosphoric acid N-methyl-N-cyclopentyl-monoamido-ethylene glycol ester, phosphoric acid N,N-dimethylamide-propylene glycol-(1,3)-ester, phosphoric acid N,N'-dimethylethylene (1,2) - diamide - monomethylester; methane phosphonic acid dimethyl ester, methanephosphonic acid diethyl ester, methanephosphonic acid dipropyl ester, methanephosphonic acid di-isopropyl ester, methane phosphonic acid dibutyl ester, methane phosphonic acid di-sec.-butyl ester, methane phosphonic acid di-isobutylester, methanephosphonic acid dichloromethyl ester, methanephosphonic acid dihydroxymethyl ester, methane phosphonic acid dimethoxymethyl ester, methane phosphonic acid dicarbomethoxy methyl ester, methane phosphonic acid di-2-methoxyethyl ester, methane phosphonic acid di-2-methoxybutyl ester, methane phosphonic acid di-2-cyanobutyl ester, methane phosphonic acid di-3-cyanobutyl ester, methane phosphonic acid di-2-methylbutyl ester, methane phosphonic acid di-3-methylbutyl ester, methane phosphonic acid mono - ω - hydroxypentyl-mono-ethyl ester, methane phosphonic acid mono-ω-chloropentyl-mono-ethyl ester, methane phosphonic acid mono-3-methyl-2-cyanomethyl-monoethyl ester, methane phosphonic acid mono-2 - methoxy - 2 - chloromethylpropane-mono-methyl ester, methane phosphonic acid mono-3-methyl-2-chlorobutyl-monomethyl ester, methane phosphonic acid mono-2-carbomethoxypropyl-monoethyl ester, methane phosphonic acid mono-2-chloro-1-chloroethyl-monomethyl ester, methane phosphonic acid dicyclobutyl ester, methane phosphonic acid dicyclohexyl ester, methane phosphonic acid monocyclohexyl-monomethyl ester, methane phosphonic acid mono-2-methylcyclohexyl-monomethyl ester, methane phosphonic acid mono - 3 - methyl-cyclohexyl-monoethyl ester, methane phosphonic acid mono-2-hydroxycyclohexyl-monoethyl ester, methanephosphonic acid ethylene glycol ester, methane phosphonic acid 1,3-propylene glycol ester, methane phosphonic acid-1,4-butyleneglycol ester, methane phosphonic acid mono - tert.butyl - mono - ethyl ester, methane phosphonic acid mono-2-carboxycyclopentyl-mono-isopropyl ester, methane phosphonic acid mono-4-carbomethoxycyclohexyl-monomethyl ester, methane phosphonic acid tetramethyldiamide, methane phosphonic acid tetraethyldiamide, methane phosphonic acid tetrabutyldiamide, methane phosphonic acid mono-N,N-dimethyl-mono-N,-methyl-tert.butyldiamide, methane phosphonic acid N,N'-dimethyl-ethylene diamide, methane phosphonic acid N,N' - diisopropyl-ethylenediamide, methane phosphonic acid N-methylaminoethanol ester amide.

In addition to the above derivatives of methane phosphonic acid, there may be used the corresponding derivatives of ethane phosphonic acid, n-propane phosphonic acid, isopropane phosphonic acid, n-butane phosphonic acid, sec.-butane phosphonic acid, tert.butane phosphonic acid, isobutane phosphonic acid, n-pentane phosphonic acid, n-hexane phosphonic acid, cyclopentane phosphonic acid, cyclohexane phosphonic acid and phenyl phosphonic acid and the corresponding derivatives of chloromethane phosphonic acid, hydroxymethane phosphonic acid, methoxymethane phosphonic acid, cyanomethane phosphonic acid, trifluoromethane phosphonic acid, benzylmethane phosphonic acid, β-chloroethane phosphonic acid, β-hydroxyethane phosphonic acid, β-methoxy-ethane phosphonic acid, β-cyanoethane phosphonic acid, β-carbomethoxyethane phosphonic acid, 1,2,3-trifluoropropane phosphonic acid, trifluoromethyl ethane phosphonic acid, 4-methoxybutane phosphonic acid, 2-cyanobutane phosphonic acid, 3-cyanobutane phosphonic acid, 4-cyanobutane phosphonic acid, 2-methyl butane phosphonic acid, 3-methylbutane phosphonic acid, ω-chloropentane phosphonic acid, ω-hydroxypentane phosphonic acid, ω-methoxypentane phosphonic acid, 2-carbomethoxypropane phosphonic acid, ω-carbomethoxybutane phosphonic acid, 2-chloropropane phosphonic acid, 2-chloro-1-chloroethyl-ethane phosphonic acid, 2-chlorocyclopentane phosphonic acid, 3-chlorocyclopentane phosphonic acid, 3-cyanocyclopentane phosphonic acid, 2-carbomethoxycyclopentane phosphonic acid, 3 - methoxymethylcyclopentane phosphonic acid, 2-chlorocyclohexane phosphonic acid, -4 methoxycyclohexane phosphonic acid, 4-cyanocyclohexane phosphonic acid, 4-hydroxycyclohexane phosphonic acid, 2-chlorphenyl phosphonic acid, 3-chlorophenyl phosphonic acid, 2,5-dichlorphenyl phosphonic acid, 2-hydroxyphenyl phosphonic acid, other compounds which may be added include trimethyl phosphine oxide, triethyl phosphine oxide, tripropyl phosphine oxide, trihydroxyethyl phosphine oxide, trichloroethyl phosphine oxide, triisopropyl phosphine oxide, P-methyl-P-oxo-phospholan, tri-β-cyanoethylphosphine oxide, tri-β-carbomethoxy phosphine oxide, monophenyl-di-β-cyanoethylphosphine oxide, mono-cyclohexyl-di-β-cyanoethyl phosphine oxide, and mono-phenyl-dimethyl-phosphine oxide; dimethyl phosphinic acid methyl ester, dimethyl phosphinic acid ethyl ester, dimethyl phosphinic acid propyl ester, dimethyl phosphinic acid isopropyl ester, dimethyl phosphinic acid n-butyl ester, dimethyl phosphinic acid sec. butyl ester, dimethyl phosphinic acid tert.-butyl ester, dimethyl phosphinic acid isobutyl ester, dimethyl phosphinic acid-n-pentyl ester, dimethyl, phosphinic acid-1-methyl-butyl ester, dimethyl phosphinic acid-2-methyl-butyl ester, dimethyl phosphinic acid-3-methyl-butyl ester, dimethyl phosphinic acid n-hexyl ester, dimethyl phosphinic acid-1-methyl-pentyl ester, dimethyl phosphinic acid-2-methyl-pentyl ester, dimethyl phosphinic acid-3-methyl-pentyl ester, dimethyl phosphinic acid-4-methyl-pentyl ester, dimethyl phosphinic acid-1-ethyl-butyl ester, dimethyl phosphinic acid-2-ethyl-butyl ester, dimethyl phosphinic acid-3-ethyl-butyl ester, dimethyl phosphinic acid chloromethyl ester, dimethyl phosphinic acid hydroxymethyl ester, dimethyl phosphinic acid methoxymethyl ester, dimethyl phosphinic acid-β-chloroethyl ester, dimethyl phosphinic acid-β-cyanoethyl ester, dimethyl phosphinic acid-β-hydroxyethyl ester, dimethyl phosphinic acid-β-methoxy ethyl ester, dimethyl phosphinic acid-β-carbomethoxyethyl ester, dimethyl phosphinic acid-2,2,2-tri-fluoroethyl ester, dimethyl phosphinic acid cyclopentyl ester, dimethyl phosphinic acid cyclohexyl ester, dimethyl phosphinic acid-2-methyl-cyclopentyl ester, dimethyl phosphinic acid-3-methyl cyclopentyl ester, dimethylphosphinic acid 2-methylcyclohexyl ester, dimethyl phosphinic acid 3-methyl-cyclohexyl ester, dimethyl phosphinic acid-4-methylcyclohexyl ester, dimethyl phosphinic acid-2-chloro-cyclopentyl ester, dimethyl phosphinic acid-3-chloro-cyclopentyl ester, dimethyl phosphinic acid-2- chloro-cyclohexyl ester, dimethyl phosphinic acid-3-chloro-cyclohexyl ester, dimethyl-phosphinic acid-4-chloro-cyclohexyl ester, dimethyl phosphinic acid-2-cyano-cyclopentyl ester, dimethyl phosphinic acid-3-cyano-cyclopentyl ester, dimethyl phosphinic acid - 2 - cyanocyclohexyl ester, dimethyl phosphinic acid-3-cyano-cyclohexyl ester, dimethyl phosphinic acid-4-cyano-cyclohexyl ester, dimethyl phosphinic acid-2-hydroxy-cyclopentyl ester, dimethyl phosphinic acid-3-hydroxycyclopentyl ester, dimethyl phosphinic acid-2-hydroxy-cyclohexyl ester, dimethyl phosphinic acid-3-hydroxy-cyclohexyl ester, dimethyl phosphinic acid-4-hydroxy-cyclohexyl ester, dimethyl phosphinic acid-2-methoxy-cyclopentyl ester, dimethyl phosphinic acid-3-methoxy-cyclopentyl ester, dimethyl phosphinic acid-2-methoxy-cyclohexyl ester, dimethyl phosphinic acid-3-methoxy-cyclohexyl ester, dimethyl phosphinic acid-4-methoxy-cyclohexyl ester, dimethyl phosphinic acid phenyl ester, dimethyl phosphinic acid-2-methyl-phenyl ester, dimethyl phosphinic acid-2-chloro-phenyl ester, dimethyl phosphinic acid-2-methoxyphenyl ester, dimethyl phosphinic acid-2-cyanophenyl ester, dimethyl phosphinic acid-2-carbomethoxy-phenyl ester, dimethyl phosphinic acid-3-methyl-phenyl ester, dimethyl phosphinic acid-3-chloro-phenyl ester, dimethyl phosphinic acid-3-methoxy-phenyl ester, dimethyl phosphinic acid-3-cyano-phenyl ester, dimethyl phosphinic acid-3-carbomethoxyphenyl ester, dimethyl phosphinic acid-4-cyano-phenyl ester, dimethyl phosphinic acid-4-chloro-phenyl ester, dimethyl phosphinic acid-4-hydroxy-phenyl ester, dimethyl phosphinic acid-4-methoxy-phenyl ester, dimethyl phosphinic acid-4-carbomethoxy phenyl ester, dimethyl phosphinic acid-4-tertiary butyl-phenyl ester; dimethyl phosphinic acid dimethylamide, dimethyl phosphinic acid diethylamide, dimethyl phosphinic acid di-$n$-propylamide, dimethyl phosphinic acid di-isopropylamide, dimethyl phosphinic acid $n$-butylamide, dimethyl phosphinic acid sec.-butylamide, dimethyl phosphinic acid di-isobutylamide, dimethyl phosphinic acid di-cyclobutylamide, dimethyl phosphinic acid dicyclopentylamide, dimethyl phosphinic acid dicyclohexylamide, dimethyl phosphinic acid phenyl methylamide and dimethylphosphinic acid methyl ethylamide.

In addition to the above mentioned derivatives of dimethyl phosphinic acid, there may be mentioned the corresponding derivatives of diethyl phosphinic acid, di-$n$-propyl phosphinic acid, di-$n$-butyl phosphinic acid, di-isobutyl phosphinic acid, di-sec. butyl phosphinic acid, methyl ethyl phosphinic acid, methyl propyl phosphinic acid, ethyl propyl phosphinic acid, dicyclopentyl phosphinic acid, di-cyclohexyl phosphinic acid, cyclopentyl methyl phosphinic acid, cyclohexyl ethyl phosphinic acid, phenyl ethyl phosphinic acid, bis-$\beta$-cyanoethyl phosphinic acid, bis-$\beta$-chloroethyl phosphinic acid, bis-$\beta$-hydroxyethyl phosphinic acid, bis-$\beta$-methoxyethyl phosphinic acid, bis-$\beta$-carbomethoxyethyl phosphinic acid and bis-tri-fluoromethane phosphinic acid and of 1-hydroxy-1-oxo-phospholan.

As starting material for the process according to the invention, aqueous hydrogen peroxide may be used in any concentration. It is generally used in concentrations of about 2.5 to 50%, and preferably about 3 to 35%, of $H_2O_2$ by weight.

The inert diluents used may be any of the solvents commonly used for azeotropic distillation, e.g. ethyl acetate, butyl acetate, propyl acetate, propyl propionate, toluene, xylene, or the like.

The carboxylic acids used for the process according to the invention may be straight chained or branchd carboxylic acids having 1 to 10 carbon atoms or the corresponding carboxylic acid anhydrides. The following are mentioned as specific representative examples: Formic acid, acetic acid, propionic acid, butyric acid, isobutyric acid, trifluoroacetic acid, monochloroacetic acid, valeric acid, caproic acid, benzoic acid, $p$-nitrobenzoic acid, dichloroacetic acid, $\beta$-chloropropionic acid, acetic anhydride, propionic acid anhydride, butyric acid anhydride, monochloroacetic acid anhydride, trifluoroacetic acid anhydride and isobutyric acid anhydride.

Mixtures of compounds of formula (I) may be used instead of individual compounds. For example, a mixture of several phosphonic acid esters with different structures may be used or one or more phosphinic acid esters mixed with one or more phosphoric acid esters. The proportion in which the different phosphorus compounds are mixed is so chosen that the physical properties of the mixture allow for the most advantageous working up of the reaction products, i.e. the mixtures are so chosen that they afford some advantage over the use of only a single compound of formula (I) by virtue of their solubility and boiling point.

The quantity of the compound or mixture of compounds of formula (I) added to the aqueous peroxide solution according to the invention may vary within wide limits. The choice of proportions of phosphorus compounds to aqueous hydrogen peroxide solution depends, of course, on the physical properties of the phosphorus compound or mixture of compounds of formula (I), and particularly the solubility properties such as the miscibility of the phosphorus compounds with the aqueous hydrogen peroxide solution. As a general rule, the quantity of compound of formula (I) added is such that, after removal of water, the hydrogen peroxide is in the form of a 5 to 50% solution, preferably a 15 to 30% solution.

The procedure for carrying out the process according to the invention generally starts with the removal of water from the substantially homogeneous mixture of hydrogen peroxide, water and organic phosphoric acid compound of formula (I). This removal of water may be carried out by various known methods, e.g. by distillation, azeotropic distillation with an inert diluent, separation of the water by freezing it or by binding it to a dehydrating agent, or other suitable methods. In this way, practically anhydrous solutions of hydrogen peroxide in organic phosphorus compounds of formula (I) are obtained to which the carboxylic acids or carboxylic acid anhydrides are then added. If carboxylic acids are used, it is advantageous to dehydrate once more and to separate the water which has been formed in accordance with the following equation:

The resulting solutions of percarboxylic acids in organic phosphorus compounds of formula (I) may be worked up directly or they may first be treated to isolate the percarboxylic acids, e.g. by crystallization by distillation or by simultaneous distillation with an inert diluent.

In most cases, it is preferable to remove the water introduced with hydrogen peroxide by simple distillation, preferably under a vacuum, e.g. a vacuum below about 400 mm. Hg and preferably between about 100 and 20 mm. Hg. The known commercial apparatus is suitable for this operation, e.g. evaporator tubes, thin layer evaporators or downflow evaporators, and the distillation may be carried out with or without the use of a distillation column. According to a particularly preferred method of carrying out the process, the removal of water and particularly the removal of the last residues of water is carried out by azeotropic distillation with an inert diluent such as methyl acetate, ethyl acetate, propyl acetate, isoamyl acetate, benzene, toluene, xylene or methylene chloride. Azeotropic distillation is advantageously also carried out under a vacuum, e.g. at pressures below about 400 mm. Hg and preferably between about 200 mm. Hg and 20 mm. Hg. The temperature in the distillation sumps is thereby kept below about 80° C. Since renewed dehydration is necessary after the addition of acids in cases where carboxylic acids are used, it will very frequently be preferred to combine the reaction between hydrogen peroxide and carboxylic acids with the removal of the water originally used as a solvent for $H_2O_2$. According to a preferred embodiment of the process, the final removal of water from the hydrogen peroxide solutions is carried out simultaneously with the reaction of carboxylic acids with $H_2O_2$, in particular by azeotropic distillation with an inert diluent. For this purpose, there is preferably used a mixture of aromatic hydrocarbons and carboxylic acidesters, e.g. benzene, toluene, xylene, propyl acetate, butyl acetate and amyl acetate. By carrying out the dehydration by means of a mixture of aromatic compounds and esters, only a very small quantity of hydrogen peroxide distils over with the solvent and at the same time a high rate of dehydration is achieved. Since the reaction products are liable to undergo decomposition, the vacuum used is generally such that the resulting boiling temperature will be below about 80° C., and preferably between about 70° C. and 40° C. The diluent preferably used is methylene chloride; when this is used, the application of a vacuum may be omitted. The azeotropic distillation may be carried out in any of the usual commercial apparatus for this purpose. As a rule, it is carried out as an esterification reaction with the continuous removal of the aqueous phase.

Suitable carboxylic acids for the reaction of the hydrogen peroxide to yield percarboxylic acid are any carboxylic acids which are inert to the reaction medium. It is preferred to use carboxylic acids which are readily soluble in the reaction medium according to the invention. These are particularly the straight chained low aliphatic fatty acids which have 1 to 6 carbon atoms, particularly acetic acid, propionic acid, trifluoroacetic acid and butyric acid. However, derivatives of carboxylic acids which liberate carboxylic acid, the carboxylic acid anion or the acyl radical only under the reaction conditions, e.g. acid chlorides, esters or salts, may also be used. According to the invention, the reaction of hydrogen peroxide with carboxylic acids or carboxylic acid anhydrides may be carried out practically quantitatively, the carboxylic acid or acid anhydride being then used in stoichiometric quantities. In order to achieve a high reaction velocity, however, it is advantageous to use an excess of carboxylic acid or carboxylic acid anhydride. The molar ratio of hydrogen peroxide to carboxylic acid or carboxylic acid anhydride is preferably between about 1:1.1 and 1:2.

A very particular advantage of the process is that carboxylic acids provide practically the same yields of per acids as carboxylic acid anhydrides. If carboxylic acid anhydrides are used in the process previously known, the free carboxylic acid produced after the reaction of percarboxylic acid must be converted into carboxylic acid anhydride before it can be used again for the reaction. This complicated and costly step of the process is eliminated with this particular method of carrying out the process. The reaction between $H_2O_2$ and carboxylic acids may advantageously be accelerated with known esterification catalysts, e.g. sulfuric acid, paratoluenesulfonic acid, ion exchangers, zeolites, etc.

Since the low molecular weight percarboxylic acids are relatively volatile, a portion of the peracids, e.g. of performic acid or peracetic acid, may be driven off with the dehydrating agent in the course of dehydration, especially if dehydration is carried out under a vacuum. This does not entail any loss since the peracids can easily be isolated or returned to the process without loss. For example, they may be added to the aqueous hydrogen peroxide starting solution as the lower phase of condensed evaporation liquors. Alternatively, the peracids may be recovered by the usual methods, e.g. by extraction, from the lower phase of the condensed evaporation liquors.

The ease with which percarboxylic acids, e.g. peracetic acid, are driven off with the dehydrating agent, e.g. toluene, xylene, butyl acetate, amyl acetate or propyl acetate, may be utilized to advantage for the purification of the percarboxylic acids.

According to a preferred embodiment of the invention, the percarboxylic acids and especially peractic acid are separated from the reaction mixture by distilling them together with the diluent, preferably under a vacuum of less than about 100 mm. Hg, and the resulting solutions of percarboxylic acid, e.g. of peracetic acid, are then worked up in the diluent used.

When isolating the peracid, e.g. by distillation with an inert diluent such as butyl acetate, amyl acetate, propyl propionate, butyl propionate or toluene, it is not necessary to convert all the hydrogen peroxide used into peracid, nor is it necessary to isolate all the peracid formed since any unconverted $H_2O_2$ or any peracetic acid which has not been isolated can be used again with practically no loss. This applies particularly to the continuous method of carrying out the process of the invention, in which the unconverted or unisolated portions can be continuously returned.

The question of materials used for the process can be solved as in all peroxide processes, for example, the process may be carried out in plastic coated vessels or enamelled vessels, in refined steel apparatus which has been carefully passivated or in passivated aluminum apparatus.

There is one important advantage of the process which contributes to the operational safety of a production plant used for the process of the invention, namely, the fact that it can always be carried out within a safe range of temperatures and concentrations.

The practice of the invention is illustrated in the following representative examples wherein all parts are by weight unless otherwise expressed.

Example 1

(a) 70 g. of the dimethyl ester of methane phosphonic acid are added to an aqueous solution of $H_2O_2$ which contains 36.30 g. of $H_2O_2$ and 560 g. of $H_2O$, and 548 g. of $H_2O$ containing 0.22% of $H_2O_2$ are distilled off with slight reflux at 24 mm. Hg over a glass column which contains polyethylene filler bodies, and a distillation residue of 117.8 g. containing 29.8% of $H_2O_2$ is obtained.

(b) 23.0 g. of acetic acid and 0.8 g. of $H_2SO_4$ are added to 30 g. of the solution obtained according to (a) which contains 9.11 g. of $H_2O_2$ in the dimethyl ester of methane sulphonic acid. A sufficient quantity (129 g.) of a mixture of 90% of benzene and 10% of ethyl acetate to ensure the efficiency of the water separator is then added and distillation is carried out at 175 mm. Hg with total reflux of the lighter phase until no more of the heavier phase separates in the condensate. The individual portions then have the following analytical composition:

|  | Percent by weight of— | |
| --- | --- | --- |
|  | $H_2O_2$ | Peracetic acid |
| Distillation sump (107.2 g.) | 0.45 | 14.40 |
| Upper phase of condensate (68.3 g.) | 0.08 | 3.24 |
| Lower phase of condensate (7.8 g.) | 0.57 | 30.08 |

The distillation sump obtained is combined with the upper phase of the condensate. The aqueous lower phase is added to the solution obtained according to (a) in order to be used again, an organic phase (175.5 g.) being obtained which contains 0.31% by weight of $H_2O_2$ and 10.06% by weight of peracetic acid.

Example 2

30 g. of a solution obtained by a process analogous to Example 1(a) and containing 29.05% of $H_2O_2$ (8.71 g.) in the dimethyl ester of β-cyanoethyl phosphonic acid, are mixed with 29.5 g. of propionic acid and 0.2 g. of $H_2SO_4$ in a flask equipped with a distillation column and a water separater. A sufficient amount (140 g.) of a mixture of 50% of toluene and 50% of butyl acetate to ensure the efficiency of the water separator is then added, and distillation is carried out at 45 mm. Hg with a complete reflux of the upper phase of the condensate, until no more of the heavier phase separates there. The different portions obtained are then found to have the following analytical composition:

| | Percent by weight of— | |
|---|---|---|
| | $H_2O_2$ | Perpropionic acid |
| Distillation sump (88.2 g.) | 0.33 | 12.77 |
| Upper phase of condensate (103.5 g.) | 0.12 | 9.49 |
| Lower phase of condensate (1.5 g.) | 2.14 | 17.40 |

Example 3

17.5 g. of ethyl acetate and 0.5 g. of $H_2SO_4$ are added to 17.5 g. of a solution which contains 28.36% of $H_2O_2$ (4.96 g. of $H_2O_2$) in the dimethyl ester of $\beta$-cyanoethyl phosphonic acid, and 22.95 g. of acetic acid anhydride are then added, the temperature being maintained at 40° C. The reaction is completed after 30 minutes, a distillation residue which contains 18.1% by weight of peracetic acid and 0.39% by weight of $H_2O_2$ being obtained.

Example 4

(a) 140 g. of triethylphosphate are added to a solution of 71.4 g. of $H_2O_2$ in 529 g. of $H_2O$, and 523 g. of water containing 1.14% of $H_2O_2$ are distilled off over a glass column which is filled with polyethylene filler bodies, 207.1 g. of distillation residue containing 31.36% of $H_2O_2$ remaining behind.

(b) 24.6 g. of acetic acid and 0.8 g. of $H_2SO_4$ are added to 30 g. of a solution obtained according to (a) containing 30.25% of $H_2O_2$ (9.07 g.) in triethyl phosphate. A sufficient quantity of benzene (80 g.) is added and distillation is carried out at 175 mm. Hg with total reflux of the benzene phase until no more lower phase separates.

The following analytical composition is then found:

| | Percent by weight of— | |
|---|---|---|
| | $H_2O_2$ | Peracetic acid |
| Distillation sump liquid (84.6 g.) | 0.14 | 13.84 |
| Upper phase of condensate (25.5 g.) | 0.05 | 8.62 |
| Lower phase of condensate (12.6 g.) | 2.36 | 45.00 |

In this case also, the upper phase of the condensate may be combined with the sump liquid. The aqueous phase may also be mixed with the starting solution.

Example 5

30 g. of methylene chloride and 0.8 g. of $H_2SO_4$ are introduced into 30.0 g. of a solution of 31.36% of $H_2O_2$ (9.41 g. of $H_2O_2$) in triethylphosphate, and 45.4 g. of acetic acid anhydride are added at 40° C. The composition of the reaction mixture after a reaction time of 60 minutes is found to be 0.41% by weight of $H_2O_2$ and 19.59% by weight of peracetic acid; after 120 minutes of reaction time, it is found to be 0.30% by weight of $H_2O_2$ and 19.88% by weight of peracetic acid.

Comparable results are obtained with hexamethylphosphoric acid triamide, tetramethylmethane phosphonic acid diamide, 1-methyl-1-oxophospholane and 1-methoxy-1-oxophospholane instead of triethyl phosphate.

Example 6

(a) 0.8 g. of $H_2SO_4$ and 16.7 g. (0.28 mol) of acetic acid are added to a solution prepared according to Example 1 (a) of 9.45 g. (0.28 mol) of $H_2O_2$ in 27.6 g. of the dimethyl ester of methanephosphonic acid in a flask equipped with a glass column packed with polyethylene filler material. 250 ml. of $n$-butyl acetate are then added dropwise in the course of one hour and are continuously distilled over at 50 mm. Hg together with the peracetic acid which is formed. The individual portions are then found to have the following analytical composition:

| | | Percent | | |
|---|---|---|---|---|
| | Weight (g.) | Total active oxygen calculated as $H_2O_2$ | $H_2O_2$ | Peracetic acid |
| Distillation sump liquid | 43 | 7.38 | 4.11 | 7.32 |
| Distillate | 228.5 | 2.80 | 0.07 | 6.10 |

(b) A solution of 9.84 g. of $H_2O_2$ in 175 g. of $H_2O$ is added to the sump liquid of 45 g. obtained according to Example 6 (a) the sump liquid containing 2.83% (1.77 g.) of $H_2O_2$ and 6.47% (2.90 g.) of peracetic acid. Dehydration is carried out according to Example 1 (a), but the result differs from that obtained in Example 1 (a) in that an additional organic phase is obtained in the distillate, this organic phase consisting of butyl acetate which had been dissolved in the starting material prepared according to 6 (a). The individual portions are found to have the following analytical composition:

| | Weight (g.) | Percent | |
|---|---|---|---|
| | | $H_2O_2$ | Peracetic acid |
| Distillation sump liquid | 51.6 | 20.96 | 2.69 |
| Upper phase of distillate | 19.1 | 0.10 | 0.70 |
| Aqueous phase of distillate | 157.4 | 0.09 | 0.91 |

The sump liquid is reused according to 6 (a) for the preparation of peracetic acid. This demonstrates that it is not necessary either to convert all the hydrogen peroxide into peracetic acid or to isolate the peracid completely since the unreacted and unisolated portions can be used again without loss. This applies particularly to the continuous method of carrying out the process of the invention, in which the unreacted portions are recycled.

It will be appreciated that the instant specification and examples are set forth by way of illustration and not limitation, and that various modifications and changes may be made without departing from the spirit and scope of the present invention.

What is claimed is:

1. In the preparation of a percarboxylic acid by reaction at a temperature of about −20 to 100° C. of a carboxylic acid or its anhydride with hydrogen peroxide, the carboxylic acid being selected from the group consisting of alkanoic, halogen substituted alkanoic, benzoic and nitro-substituted benzoic acids, the improvement which comprises adding to a dilute aqueous hydrogen peroxide solution a phosphorus compound of the formula

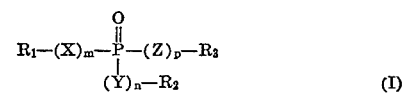

(I)

wherein:
X, Y and Z each individually is an oxygen atom, an >N—$C_1$-$C_6$ alkyl or an >N—$C_4$-$SC_7$ cycloalkyl group,
m, n and p each individually is 0 or 1,
$R_1$, $R_2$ and $R_3$ each individually is a $C_1$-$C_6$ alkyl or $C_4$-$C_6$ cycloalkyl radical optionally substituted with halogen, OH, lower alkoxy, CN or phenyl; or a phenyl radical optionally substituted with halogen, OH, lower alkyl or alkoxy, carbo-lower alkoxy or CN, or two of $R_1$, $R_2$ and $R_3$ together comprise an alkylene radical forming a 5- to 7-membered heterocyclic ring containing phosphorus as a hetero atom, removing the water from said aqueous hydrogen peroxide phosphorus compound-containing solution at least in part, and using the residue to effect said reaction with said carboxylic acid or its anhydride.

2. Process according to claim 1, wherein the product is subjected to distillation to remove water therefrom.

3. Process according to claim 1, wherein in addition to the phosphorus compound an inert diluent is added to said aqueous hydrogen peroxide solution, and water is removed therefrom by distillation.

4. Process according to claim 3, wherein the distillation is effected at a pressure below about 400 mm. Hg.

5. Process according to claim 4, wherein the phosphorus compound is first added to the aqueous hydrogen peroxide solution, water is removed by distillation, the inert diluent is added to the distillation residue, and further distillation is effected to remove additional water by azeotropic distillation with the diluent.

6. Process according to claim 5, wherein the carboxylic acid or its anhydride is added prior to said further distillation.

7. Process according to claim 1, wherein said carboxylic acid comprises acetic acid, chloroacetic acid or propionic acid.

8. Process according to claim 1, wherein the molar ratio of hydrogen peroxide to carboxylic acid or its anhydried is about 1:1.1–2.

9. Process according to claim 6, wherein the further distillation also serves to remove the peracid.

10. Process according to claim 3, wherein the inert diluent comprises butyl acetate.

11. Process according to claim 1, wherein said phosphorus compounds has the general formula

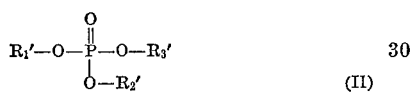

(II)

wherein
R$_1'$, R$_2'$ and R$_3'$ each individually is a lower alkyl, cyclopentyl or cyclohexyl radical optionally substituted by at least one halogen, hydroxy, loweralkoxy, carbo-lower-alkoxy, CN or phenyl radical, or one of R$_1'$, R$_2'$ and R$_3'$ is a phenyl radical optionally substituted by at least halogen, hydroxy, lower-alkyl, lower-alkoxy or CN radical.

12. Process according to claim 1, wherein said phosphorus compound has the general formula

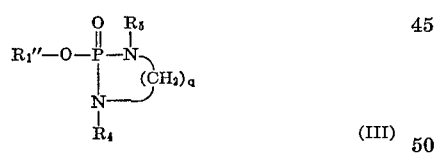

(III)

wherein
R$_1''$ is a lower alkyl, cyclopentyl, cyclohexyl or phenyl radical optionally substituted by at least one halogen, lower alkoxy, carbo-lower alkoxy, CN or phenyl radical,
R$_4$ and R$_5$ each individually is a lower alkyl radical, and $q$ is an integer from 2 to 4.

13. Process according to claim 1, wherein said phosphorus compound has the general formula

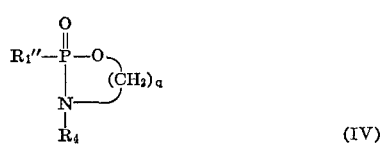

(IV)

wherein
R$_1''$ is a lower alkyl, cyclopentyl, cyclohexyl or phenyl radical optionally substituted by at least one halogen, hydroxy, lower alkoxy, carbo-lower alkoxy, CN or phenyl radical,
R$_4$ is a lower alkyl radical, and
$q$ is an integer from 2 to 4.

14. Process according to claim 1, wherein said phosphorus compound has the general formula

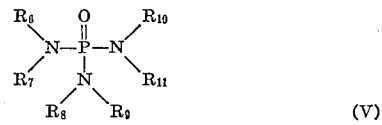

(V)

wherein
R$_6$, R$_7$, R$_8$, R$_9$, R$_{10}$ and R$_{11}$ each is a lower alkyl radical optionally substituted with at least one hydroxy or CN radical.

15. Process according to claim 1, wherein said phosphorus compound has the general formula

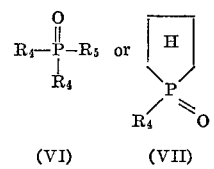

(VI)      (VII)

wherein
R$_4$ and R$_5$ each is a lower alkyl radical.

16. Process according to claim 1, wherein said phosphorus compound has the general formula

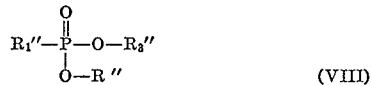

(VIII)

wherein
R$_1''$ is a lower alkyl, cyclopentyl, cyclohexyl or phenyl radical optionally substituted by at least one halogen, hydroxy, lower alkoxy, carbo-lower alkoxy, CN or phenyl radical,
R$_2''$ and R$_3''$ each individually is a C$_1$–C$_6$ alkyl or C$_4$–C$_6$ cycloalkyl radical optionally substituted by at least one halogen, hydroxy, lower alkoxy, carbo-lower alkoxy, CN or phenyl radical.

17. Process according to claim 1, wherein said phosphorus compound has the general formula

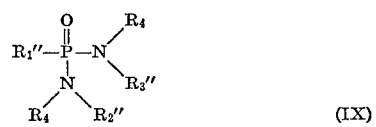

(IX)

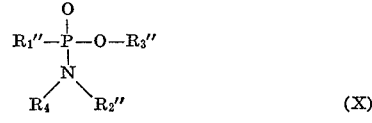

(X)

or

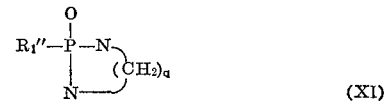

(XI)

wherein
R$_1''$ is a lower alkyl, cyclopentyl, cyclohexyl or phenyl radical optionally substituted by at least one halogen, hydroxy, lower alkoxy, carbo-lower alkoxy, CN or phenyl radical,
R$_2''$ and R$_3''$ each individually is a C$_1$–C$_6$ alkyl or C$_4$–C$_6$ cycloalkyl radical optionally substituted by at least one halogen, hydroxy, lower alkoxy, carbo-lower alkoxy, CN or phenyl radical,
R$_4$ is a lower alkyl radical, and
$q$ is an integer from 2 to 4.

18. Process according to claim 1, wherein said phosphorus compound has the general formula

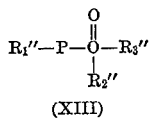

(XIII)

or

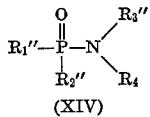

(XIV)

wherein
$R_1''$ is a lower alkyl, cyclopentyl, cyclohexyl or phenyl radical optionally substituted by at least one halogen, hydroxy, lower alkoxy, carbo-lower alkoxy, CN or phenyl radical,
$R_2''$ and $R_3''$ each individually is a $C_1$–$C_6$ alkyl or $C_4$–$C_6$ cycloalkyl radical optionally substituted by at least one halogen, hydroxy, lower alkoxy, carbo-lower alkoxy, CN or phenyl radical, and
$R_4$ is a lower alkyl radical.

19. Process according to claim 1, wherein said phosphorus compound has the general formula

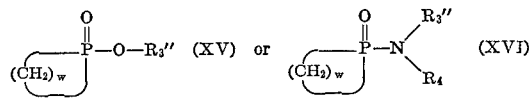

wherein
$R_3''$ is a $C_1$–$C_6$ alkyl or $C_4$–$C_6$ cycloalkyl radical optionally substituted by at least one halogen, hydroxy, lower alkoxy, carbo-lower alkoxy, CN or phenyl radical,
$R_4$ is a lower alkyl radical, and
$w$ is an integer from 4 to 7.

20. Process according to claim 1, wherein said phosphorus compound has the general formula

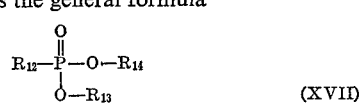

wherein
$R_{12}$, $R_{13}$ and $R_{14}$ each individually is a lower alkyl radical optionally substituted by at least one halogen, hydroxy, lower alkoxy, carbo-lower alkoxy, CN or phenyl radical.

21. Process according to claim 1, wherein said phosphorus compound has the general formula

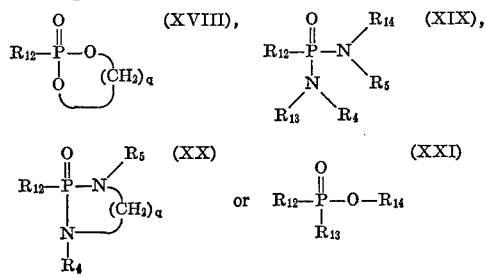

wherein
$R_4$ and $R_5$ each individually is a lower alkyl radical,
$R_{12}$, $R_{13}$ and $R_{14}$ each individually is a lower alkyl radical optionally substituted by at least one halogen, hydroxy, lower alkoxy, carbo-lower alkoxy, CN or phenyl radical, and
$q$ is an integer from 2 to 4.

22. Process according to claim 1, wherein said phosphorus compound has the general formula

(XXII)

wherein
$R_{14}$ is a lower alkyl radical optionally substituted by at least one halogen, hydroxy, lower alkoxy, carbo-lower alkoxy, CN or phenyl radical, and
$t$ is 4 or 5.

23. Process according to claim 1, wherein said phosphorus compound has the general formula

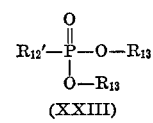

(XXIII)

wherein
$R_{12}'$ is a lower alkyl radical optionally substituted by at least one hydroxy or methoxy group, and
$R_{13}$ is a lower alkyl radical optionally substituted by at least one halogen, hydroxy, lower alkoxy, carbo-lower alkoxy, CN or phenyl radical.

24. Process according to claim 1, wherein said phosphorus compound has the general formula

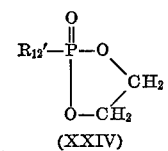

(XXIV)

wherein
$R_{12}'$ is a lower alkyl radical optionally substituted by at least one hydroxy or methoxy group.

25. Process according to claim 1, wherein X, Y and Z are oxygen.

References Cited
UNITED STATES PATENTS
2,814,641  11/1957  Phillips et al. _____ 260—502 R
2,910,504  10/1959  Hawkinson et al. ___ 260—502 R

FOREIGN PATENTS
975,715  11/1964  Great Britain _____ 260—502 R

BERNARD HELFIN, Primary Examiner
W. B. LONE, Assistant Examiner

UNITED STATES PATENT OFFICE
CERTIFICATE OF CORRECTION

PO-1050 (5/69)

Patent No. 3,845,112          Dated  October 29, 1974

Inventor(s)  Helmut Waldmann et al

It is certified that error appears in the above-identified patent and that said Letters Patent are hereby corrected as shown below:

Col. 1, line 27, cancel " $>\!\!-C_1-C_6$ " and substitute -- $>\!\!N-C_1-C_6$ --.

Col. 1, line 58, correct spelling of "esters".

Col. 3, line 11, after "alkyl group;" insert line as follows:

-- $m$, $n$, and $p$ each is 0 or 1; --

Col. 14, claim 1, line 3 after structural formula, cancel "$SC_7$" and substitute -- $C_7$ --.

Signed and sealed this 20th day of May 1975.

(SEAL)
Attest:

RUTH C. MASON
Attesting Officer

C. MARSHALL DANN
Commissioner of Patents
and Trademarks